US010080274B2

(12) United States Patent
Johnson

(10) Patent No.: US 10,080,274 B2
(45) Date of Patent: Sep. 18, 2018

(54) CONTROL MODULES HAVING INTEGRAL ANTENNA COMPONENTS FOR LUMINAIRES AND WIRELESS INTELLIGENT LIGHTING SYSTEMS CONTAINING THE SAME

(71) Applicant: ABL IP Holding LLC, Conyers, GA (US)

(72) Inventor: John Johnson, Flowery Branch, GA (US)

(73) Assignee: ABL IP HOLDING LLC, Conyers, GA (US)

(*) Notice: Subject to any disclaimer, the term of this patent is extended or adjusted under 35 U.S.C. 154(b) by 0 days.

(21) Appl. No.: 15/260,380

(22) Filed: Sep. 9, 2016

(65) Prior Publication Data

US 2018/0077779 A1     Mar. 15, 2018

(51) Int. Cl.
| H05B 37/02 | (2006.01) |
| F21V 5/04 | (2006.01) |
| F21V 15/015 | (2006.01) |
| H05B 33/08 | (2006.01) |
| H01Q 1/38 | (2006.01) |
| H01Q 19/06 | (2006.01) |

(Continued)

(52) U.S. Cl.
CPC ......... *H05B 37/0272* (2013.01); *F21V 5/045* (2013.01); *F21V 15/015* (2013.01); *H01Q 1/2291* (2013.01); *H01Q 1/38* (2013.01); *H01Q 1/42* (2013.01); *H01Q 19/06* (2013.01); *H05B 33/0854* (2013.01); *H05B 37/0218* (2013.01); *F21Y 2115/10* (2016.08)

(58) Field of Classification Search
CPC .. F21V 15/015; F21V 15/045; F21Y 2115/10; H01Q 1/2291; H01Q 1/38; H01Q 1/42; H01Q 19/06; H05B 33/0854; H05B 37/0218; H05B 37/0272
See application file for complete search history.

(56) References Cited

U.S. PATENT DOCUMENTS 6,901,688 B1 * 6/2005 King ..................... G09F 13/04
40/465
6,952,165 B2   10/2005 Kovach et al.
(Continued)

FOREIGN PATENT DOCUMENTS

WO    WO 2015/183566 A1    12/2015

OTHER PUBLICATIONS

Canadian Office Action for Canadian Application No. 2,978,313, dated Jul. 19, 2018, 5 pages.

*Primary Examiner* — Alexander H Taningco
*Assistant Examiner* — Kurtis R Bahr
(74) *Attorney, Agent, or Firm* — RatnerPrestia

(57) ABSTRACT

A sensor and control module is provided that includes an antenna formed as an integral component of a lens fastener or a housing of the module. A lens may be attached to the housing by the lens fastener. The module may further include a light responsive detector located in the housing so as to receive light through the lens, circuitry configured to generate a control signal dependent on the light sensed by the light responsive detector, and a wireless radio-frequency transmitter coupled to the antenna and configured to wirelessly transmit the control signal via the antenna. The sensor and control module may be incorporated in a luminaire within a wireless lighting control system.

27 Claims, 8 Drawing Sheets

(51) Int. Cl.
  *H01Q 1/22* (2006.01)
  *H01Q 1/42* (2006.01)
  *F21Y 115/10* (2016.01)

(56) References Cited

U.S. PATENT DOCUMENTS

| | | | |
|---|---|---|---|
| 7,358,927 B2* | 4/2008 | Luebke | H01Q 1/40 343/907 |
| 7,592,967 B2 | 9/2009 | Mosebrook et al. | |
| 7,741,782 B2 | 6/2010 | Vermeulen et al. | |
| 7,800,049 B2* | 9/2010 | Bandringa | G08B 29/183 250/239 |
| 8,089,414 B2* | 1/2012 | Feldstein | H01Q 1/007 343/702 |
| 8,228,184 B2* | 7/2012 | Blakeley | G08B 13/191 340/539.1 |
| 8,653,984 B2* | 2/2014 | Ivey | F21V 33/0076 340/286.05 |
| 9,332,618 B2* | 5/2016 | Nagashima | H05B 33/0803 |
| 9,622,321 B2* | 4/2017 | Creasman | G01J 1/0271 |
| 2009/0251058 A1* | 10/2009 | Chen | H05B 37/0218 315/159 |
| 2010/0039253 A1* | 2/2010 | Zang | G08B 13/19602 340/539.1 |
| 2011/0163672 A1* | 7/2011 | Shew | H02J 9/065 315/86 |
| 2012/0183793 A1 | 7/2012 | John et al. | |
| 2012/0274208 A1* | 11/2012 | Chen | H01Q 1/38 315/34 |
| 2013/0020883 A1* | 1/2013 | Ashoff | H05B 35/00 307/116 |
| 2013/0051008 A1* | 2/2013 | Shew | H02J 9/065 362/235 |
| 2013/0144411 A1* | 6/2013 | Savarese | G06F 17/40 700/91 |
| 2014/0125250 A1 | 5/2014 | Wilbur | |
| 2015/0127260 A1 | 5/2015 | Muffler et al. | |
| 2016/0377272 A1* | 12/2016 | Chen | F21V 23/0457 362/235 |

* cited by examiner

CONTROL MODULES HAVING INTEGRAL ANTENNA COMPONENTS FOR LUMINAIRES AND WIRELESS INTELLIGENT LIGHTING SYSTEMS CONTAINING THE SAME

TECHNICAL FIELD

The present subject matter relates to techniques and equipment for providing wireless control modules in which a component of the control module, such as a lens fastener or a housing, includes an integral antenna. The present subject matter also relates to the luminaires and other equipment that may incorporate the wireless control modules.

BACKGROUND

Traditional luminaires can be turned ON and OFF, and in some cases may be dimmed, usually in response to user activation of a relatively simple input device connected to lines supplying power to the luminaires. Often traditional luminaires are controlled individually or as relatively small groups at separate locations. More sophisticated lighting control systems automate the operation of the luminaires throughout a building or residence based upon preset time schedules, occupancy, and/or daylight sensing. Such lighting control systems receive sensor signals at a central lighting control panel, which responds to the received signals by deciding which, if any, relays, switching devices, and/or dimming ballasts to drive in order to turn on or off and/or adjust the light levels of one or more luminaires. More recently, lighting control systems have begun to utilize wireless communications in support of monitoring and luminaire control operations.

Lighting control systems communicate with each other wirelessly via the electromagnetic spectrum and require an antenna to transmit and receive communications. When installed in the ceiling of a building, lights are often mounted on or in-plane with the ceiling, so that uniform coverage of the light is provided to the occupants below without significant shadowing or interference with objects or people moving along the floor.

For wireless communications, ceiling mounting presents a challenge for antenna placement. If the antenna is placed above the light fixture, the antenna will reside above the ceiling plane. The structure above the ceiling can be very different from one installation to the next. For example, the structure may comprise solid reinforced concrete, wooden trusses, I-beams, mechanical systems, HVAC ducting, electrical and telecommunications cables, all of which may provide significant electromagnetic variations and interferences. If the antenna is placed below the ceiling plane, it may be visible to the occupants and negatively affect the aesthetics of the architectural space.

Thus, there is a need for improved device configurations that utilize antennas, particularly that may be suitable for control devices for lighting fixtures or in other wireless intelligent lighting system elements that rely on the use of the antennas for wireless lighting system communications. It may also be desirable for the device configurations, with the antennas, to facilitate easy installation of the applicable wireless sensor and/or control modules.

SUMMARY

The concepts disclosed herein improve wireless antenna arrangements, particularly those for wireless communications for lighting systems.

In one example of a concept disclosed herein, a sensor and control module is provided that includes an antenna formed as an integral component of a lens fastener or a housing of the module. A lens may be attached to an outer surface of the housing by the lens fastener. The module may further include a light responsive detector located in the housing so as to receive light through the lens, circuitry configured to generate a control signal dependent on the light sensed by the light responsive detector, and a wireless radio-frequency transmitter coupled to the antenna and configured to wirelessly transmit the control signal via the antenna.

In another concept disclosed herein, a luminaire is provided that includes a wireless lighting control module. The control module has a lens fastener configured to extend through an aperture in an endcap of the luminaire's housing and attach a lens to the control module housing, such that the endcap is positioned between the lens fastener and the module housing. The luminaire may further include a light source within the housing, and the wireless lighting control module may control operation of the light source. The wireless lighting control module may further include a wireless transceiver located within the module housing; and an antenna associated with the lens fastener or module housing, the antenna being coupled to the wireless transceiver.

In one example of the luminaire concept, the antenna is formed as an integral component of the lens fastener extending at a location at least partially outside the wireless lighting control module. As a result, part of the antenna extends outside a portion of the interior space or volume of the luminaire that may be partially enclosed by the endcap.

In another example of the luminaire concept, the antenna is formed as an integral component of the housing.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1A:
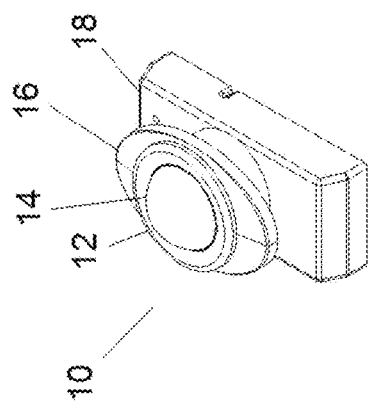
FIG. 1A is top perspective view of the front of a module, e.g. a wireless control module or a sensor and control module.
Figure 1B:
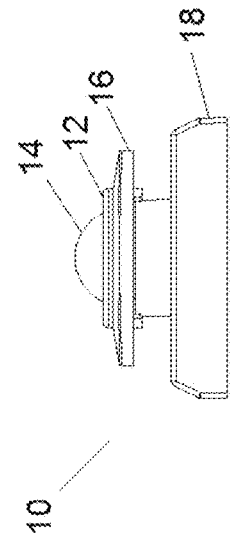
FIG. 1B is a top perspective view of the rear of the control module of FIG. 1A.
Figure 1C:
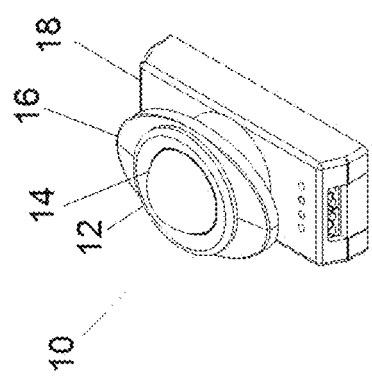
FIG. 1C is a top plan view of the control module of FIG. 1A.
Figure 1D:
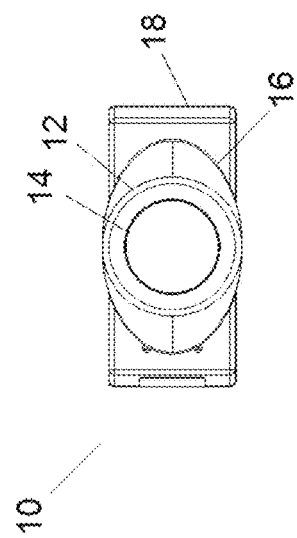
FIG. 1D is a side view of the control module of FIG. 1A.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Intelligent lighting systems that communicate with each other wirelessly via the electromagnetic spectrum use antennas to transmit and receive communications. Implementation of antennas in lighting and other similar systems raises some challenges. For example, it may be desirable to implement an RF antenna in a luminaire at a location that does not detract from the aesthetics of the luminaire once installed in a ceiling or the like. However, the antenna configuration should minimize or avoid attenuation of the RF to/from the antenna, for example, by metal components of the luminaire. Longer wavelength (lower frequency) operations may dictate a longer antenna for optimum performance, but the longer antenna is harder to hide in or around a luminaire with a metal housing without degrading RF performance. Integration with other components, for example, in a luminaire may also raise construction and/or integration challenges.

The antenna for a transmitter or transceiver operating in a particular frequency band typically has a length approximately equal to one-quarter of the wavelength of the transmission frequency. These antennas are often soldered directly to a printed circuit board (PCB). In order to comply with government regulations, manufacturers design several variants of the same product having different hard wired antennas depending on the RF requirements of a particular location or application. The antennas may also be subject to damage during manufacture or installation of the luminaires in which the antennas are installed, thus affecting performance of the antennas and creating another difficulty for manufacturers. Implementation for lighting and other applications may also be improved by further advances discussed below as to the structures utilized to attach, connect and/or mount an antenna to circuitry of wireless communication device, such as a wireless lighting control device.

Examples discussed below provide a new antenna design suitable for RF communications, e.g. for monitoring and/or control communications. Examples also encompass arrangements optimized for lighting applications, for example, for use in a luminaire so as to provide adequate RF performance yet avoid adverse effects on lighting performance (e.g. produce minimal shadow) and adverse effects on the aesthetics of the lighting equipment.

A module component is proposed that functions both as an unassuming aesthetic antenna which protrudes into the occupant space below the ceiling plane, and also serves to secure the control module with the included transceiver to an associated luminaire or the like. For a sensor module example, the component may be a lens fastener designed to secure the sensor and control module to a member of the luminaire via mating snap features in a fastener, or the component may be a housing of the sensor and control module. When the fastener with the antenna snaps together with the housing, traces of the antenna in/on the fastener part make contact with the circuit board in the sensor/radio via spring contacts. Other examples of the antenna implementation are discussed later, e.g. in which the antenna is formed in or on a surface of the module housing.

Although some or all of the concepts discussed below may be advantageous in other non-lighting applications, further discussions will concentrate on applications in lighting systems, for example with wireless communications to monitor and/or control operations of luminaires.

For that lighting related further discussion, the term "luminaire" is intended to encompass essentially any type of device that processes power to generate light, for example, for illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition light for an organism. A luminaire, for example, may take the form of a table lamp, ceiling light fixture or other lighting device that incorporates a source, where the source by itself contains no intelligence or communication capability (e.g. LEDs or the like, or lamp ("regular light bulbs") of any suitable type). Alternatively, a lighting device or luminaire may be relatively dumb but include a source device (e.g. a "light bulb") that incorporates the intelligence and communication capabilities described herein. In most examples, the luminaire(s) illuminate a service area to a level useful for a human in or passing through the space, e.g. regular illumination of a room or corridor in a building or of an outdoor space such as a street, sidewalk, parking lot or performance premises served by a lighting system may have other lighting purposes, such as signage for an entrance or to indicate an exit. Of course, the luminaires may be configured for still other purposes, e.g. to benefit human or non-human organisms or to repel or even impair certain organisms or individuals.

As outlined above, each luminaire includes a light source. The light source may be any type of light emitting unit, including but not limited to light emitting diodes (LEDs), incandescent or fluorescent lamps, halogen or halide lamps, neon tubes, etc. In the examples described herein, the luminaires also have smart capabilities. For example, the luminaires include or connect to an associated lighting control device that has a processor as well as one or more radio frequency (RF) transceivers to perform wireless communications with other luminaires and other wireless lighting control devices (e.g. Wall Switches, Sensors, etc.). The lighting control device included in luminaires utilize antenna assemblies as described in examples below. To work with and control such luminaires, a wall switch or sensor type lighting control device typically includes a compatible RF transceiver and possibly an antenna assembly as described in examples below. By incorporating an antenna assembly as described herein, the wall switch or sensor type lighting control device may also be wireless or wired, and the antenna may extend outside a metal junction box for the control device, thus improving antenna performance. The wall switch or sensor type lighting control device may also include a processor, memory and firmware or other programming to configure the device to operate as outlined herein. The wireless communication capability may extend to a gateway or other access point for communications outside the premises. Alternatively or in addition, the wireless communication capability may enable the lighting control device(s) to communicate with other devices at the premises, such as mobile devices of technicians or occupants.

The premises may be any location or locations serviced for lighting and other purposes by a system of the type described herein. Most of the examples discussed below focus on indoor building installations, for convenience. Hence, such a system may provide lighting in a number of service areas in or associated with a building, such as various rooms, hallways, corridors or storage areas of a building. Any building forming or at the premises, for example, may be an individual or multi-resident dwelling or may provide space for one or more enterprises and/or any combination of residential and enterprise facilities. A premises may include any number of such buildings; and, in a multi-building scenario, the premises may include outdoor spaces and lighting in areas between and around the buildings, e.g. in a campus configuration. The system may include any number of luminaires and lighting control devices arranged to illuminate each area of the particular premises.

The lighting control devices in a system such as outlined above utilize wireless communications in one or more RF bands. For those communication purposes, each wireless enabled lighting control device will have one or more antennas. Implementation of antennas for effective wireless communication in lighting equipment raises various technical concerns, examples of which are outlined above.

According to various examples disclosed herein, a control device for a luminaire is provided that includes an aesthetically pleasing antenna structure that protrudes in the occupant space below the ceiling plane. The luminaire may be installed in various building applications and is able to be incorporated in a wireless intelligent lighting system having a reduced likelihood of interference with structures above the ceiling plane. The snap-in arrangement of the lens fastener example also offers easy assembly with the luminaire, for example, without necessarily requiring the use of a tool.

Reference now is made in detail to the examples illustrated in the accompanying drawings and discussed below, in which like numerals identify the same or similar features. Referring to a first example in FIGS. 1A-1D, a control device, in the form of a sensor and control module 10, e.g. for lighting application, is illustrated. The orientation shown is for ease of illustration only, and the module 10 may be installed and operational in other orientations. Directional references, such as top and bottom are relative to the illustrated orientation and are not limiting. In a ceiling installation, for example, the lens may be on the bottom and facing downward (as opposed to the illustrated top location of the lens).

With reference to the drawings, the sensor and control module 10 may include a lens assembly, where the example module 10 assembly includes a lens 14, such as a Fresnel lens, that is attached to the top of a lens fastener 16 via a lens retainer 12. The lens retainer 12 may be of any shape that retains the lens 14 in place on the top of the lens fastener 16, such as a ring-shape. The lens retainer 12 is preferably made of a single piece that may be molded from plastic and may include a male prong for mating with a corresponding female slot in the top surface of the component(s) forming the body of the lens fastener 16. As would be understood by one of skill in the art the location of the male prong and female slot may be reversed, such that the slot is provided on the lens retainer 12, while the male prong is provided on the lens fastener 16. Other techniques for attaching the retainer 12 to the body of the fastener 16, such an adhesive may be used. Alternatively, the the lens may be attached to the fastener in other ways, for example, using one or more clips instead of the retainer or via adhesive bonding of the lens directly to the body of the fastener.

The lens assembly in the illustrated example may be attached to a module housing. As discussed more later, the antenna for wireless communication is embedded in or traced onto the surface of a component of the control module, such that the antenna and the component on which it is traced form an integral component.

Figure 2:
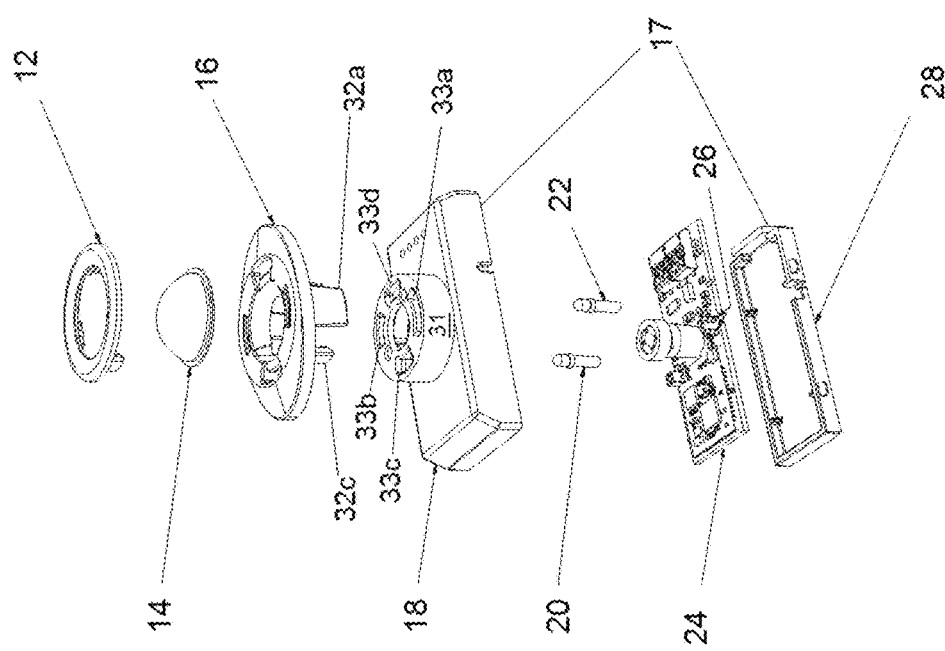
FIG. 2 is an exploded view of the control module of FIG. 1A.
Figure 3B:
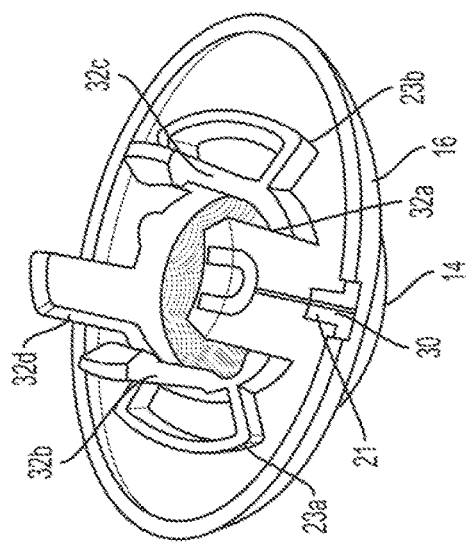
FIG. 3B is a bottom perspective view of the antenna/lens assembly of FIG. 3A.
Figure 3D:
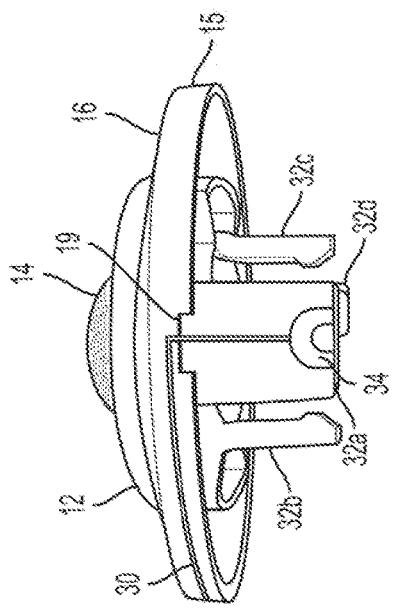
FIG. 3D is a front view of the antenna/lens assembly of FIG. 3A.
Figure 3A:
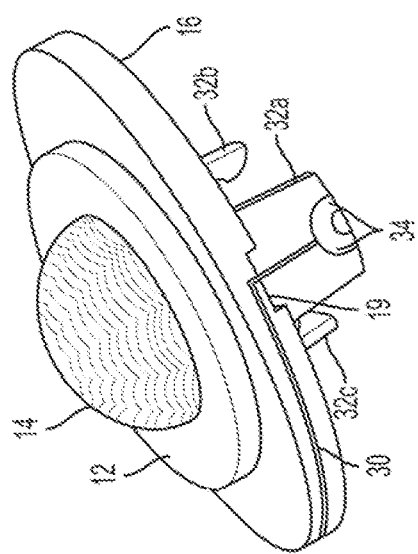
FIG. 3A is a top perspective view of an example of an antenna/lens assembly.
Figure 3C:
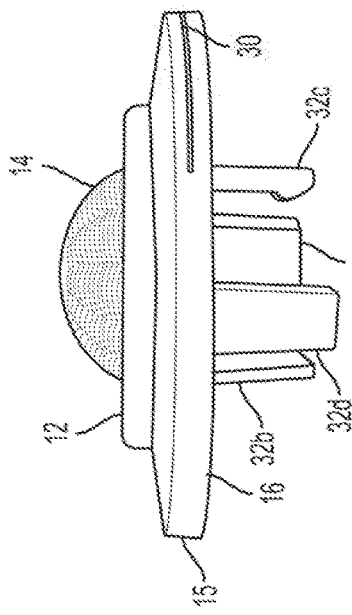
FIG. 3C is a rear view of the antenna/lens assembly of FIG. 3A.
Figure 4:
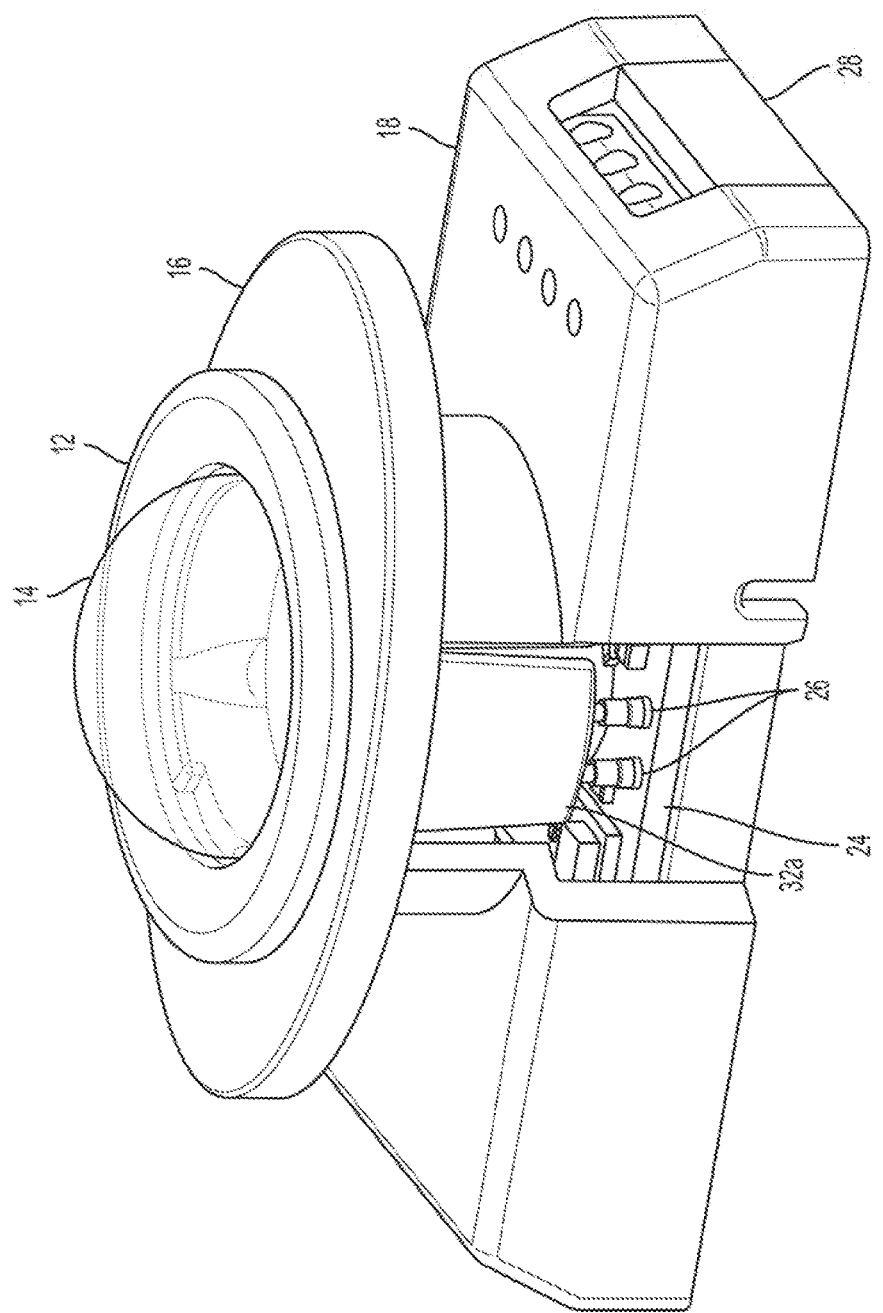
FIG. 4 is a perspective view of the control module of FIG. 1A with a portion of the housing cut away for illustration purposes.

In the illustrated example and orientation of FIG. 2, the housing 17 has a top enclosure 18 and a bottom enclosure 28. Similar to the lens retainer 12, the lens fastener 16 may be provided with one or more male prongs 32a-d that mate with corresponding slots 33a-d in a cylindrical section 31 of the top enclosure 18 of the housing 17. The dimensions of each of the slots 33a-d should match or have dimensions that generally accommodate the dimensions of the respective prong 32a-d. One or more of the male prongs may be provided with a fastening mechanism, as will be described in greater detail below.

The housing 17 may provide an enclosure for a circuit board 24. An indicator LED light pipe 20 extends from an LED on the circuit board 24 to an aperture coupled to the lens for light emission, enabling the module to provide an indication of status of the system. A photosensor light pipe 22 extends between a photodetector on the circuitry board 24 and an aperture coupled to the lens for light reception. The light responsive sensing using the photodetector may allow for the automatic adjustment of light emitted by the luminaire based on ambient conditions and/or communication of a responsive control signal over the air to other system elements. Alternatively, the circuit board 24 may include a pyroelectric presence detector and the Fresnel lens 14 and one or more light pipes 22 may direct ambient light from the service area toward pyroelectric sensors on the circuit board. These detectors may be coupled to circuitry that analyzes differences between light incident on the detectors to identify individuals moving in the service area in order to determine when the service area is occupied. A sensor and control module, however, may use additional or alternative detector technologies.

The circuit board 24 may also include a luminaire controller (not separately shown), for example, to control light emitted by the lighting elements of the luminaire to implement controlled general illumination and other lighting based services, such as visible light communication (VLC). One example of a VLC system is a location system in which each luminaire broadcasts a respective identifier (ID) value that may be received by a user-operated mobile device (not shown) in the service area. The mobile device may then determine its position by associating the ID value with a location using either previously downloaded data or data accessible to the mobile device via a server computer (not shown).

An example luminaire controller includes driver circuit (shown in later described FIG. 8) that provides power to the lighting elements and modulates the light provided by the lighting elements. For example, if the lighting elements are light emitting diodes (LEDs), the driver converts available AC (or possibly DC) power to current to drive the LEDs to achieve a desired light level. Of course other types of light sources and corresponding driver circuits may be used.

The luminaire controller may also include a processor (shown in later described FIG. 8) configured to control the operation of the lighting element via the driver/modulator circuit. The processor is also coupled to communicate via a communication interface (shown in later described FIG. 8) that includes a BlueTooth low energy (BLE) and/or sub-GHz transceiver. The communication interface provides communications functions for sending and receiving control related signals via a wireless network operating in the service area. For those purposes, the transceiver(s) of the communication interface connect to the antenna formed as an integral component of the lens fastener or the housing.

The processor circuit may be implemented via hardwired logic circuitry, or it may include a programmable processor such as a programmable central processing unit (CPU) of a microcontroller, microprocessor or the like. The luminaire controller may also include a memory, storing programming for execution by the CPU circuitry of the processor and data, including the ID value.

The luminaire controller 218 may receive lighting commands via the network and provide sensor responsive control signals and/or device status information to the network using the communications interface and the antenna. Received signals and/or commands may cause the driver/modulator to modulate power supplied to the lighting elements according to the commands and/or processed data and thereby modulate the output of the lighting elements to turn the lighting elements on or off, to change the illumination characteristics of the lighting elements, or to broadcast data on the modulated light output of the lighting elements into the service area illuminated by the luminaire. Conversely, signal transmissions from the module may cause other systems to receive status information of the luminaire and/or to act in response to command signals sent by the module.

These wireless communications utilize an antenna coupled to the transceiver(s) of the communication interface in the sensor and control module. As noted earlier, the antenna for wireless communication is formed as an integral component of the lens fastener or the module housing. We will now consider examples of such antenna implementations in more detail.

Referring now to FIGS. 3A to 3D, FIG. 4, and FIGS. 5A and 5B, the lens assembly according to one implementation may both function as an antenna and provide the mechanism to secure the sensor module to its associated light fixture. In the example of such an implementation, the antenna formed as an integral component of the lens fastener 16 together with electrical contacts to connect the antenna to circuitry on the printed circuit board 24.

Embedding or tracing the antenna may be accomplished, for example, by inserting a metal wire into a mold injected with a plastic composition to accomplish partial overmolding of the antenna with plastic. Embedding or tracing may also be accomplished, for example, by using laser-direct-structuring (LDS) technology to plate antenna traces 30 onto one or more surfaces of the lens fastener 16. LDS technology processes include the steps of providing a plastics material composition that may be molded into the form of a component, ablating the surface of the component with a laser to remove a pre-selected thin layer of plastic material to form a trace of the antenna, and finally metalizing the ablated surface using a plating solution. Any metal capable of forming a plating solution that adheres to the ablated plastic surface may be used. Exemplary metals include, but are not limited to, Cu, Ni, and Au. Au may be included for applications in which additional corrosion resistance is demanded for exposed antenna. The metallized surface may optionally be coated with a protective epoxy coating to reduce the need to include Au. An example method of performing an LDS process is disclosed in U.S. Patent Application 2012/0183793, entitled METHOD FOR SELECTIVELY METALIZING A SUBSTRATE AND INTERCONNECT DEVICE PRODUCED BY THIS METHOD, the contents of which are incorporated herein by reference.

In the example of FIGS. 3A to 3D, the metal trace 30 of the antenna is formed on the annular surface of a ring or collar portion 15 of the lens fastener 16. The ring or collar portion 15 of the lens fastener 16 abuts the outer surface of the endcap of the luminaire (see FIGS. 5A and 5B). The thickness of the collar portion 15 and the location of the metal trace 30 about the collar portion 15 may be selected to locate the antenna a desired distance away from the endcap in the installed condition. As a result, the metal trace 30 of the antenna on the peripheral surface of the ring or collar portion of the lens fastener 16 protrudes into the occupant space (e.g. below the ceiling plane when the luminaire is installed in, on or below a ceiling for downlight general illumination).

Plastic material blends manufactured for LDS processes may be more expensive than common plastic materials used to mold components because they require specialized additives, for example. In order to reduce the cost of the assembly components, such as the lens fastener 16, the components may be molded in a plurality of steps using a combination of common plastics and LDS blends, such that the use of the more expensive LDS blends are limited only to the areas of the component that will be subjected to laser ablation and metal deposition.

As mentioned above, the lens fastener 16 may be provided with a plurality of male prongs 32a, 32b, 32c, and 32d. In one example, two or more male prongs 32b, 32c may include a detent to couple the lens fastener 16 to the housing 17 upon insertion of the male prongs 32b, 32c in corresponding slots 33b, 33c in the cylindrical section 31 of the top portion 18 of the housing 17 (FIG. 2) and retain the lens fastener 16 to the top enclosure 18 of the housing 17. So that the lens fastener 16 is releasably attached to the cylindrical section 31, the male prongs 32b, 32c may be resilient, such that pulling the lens fastener 16 with sufficient force may allow separation from the top portion 18 of the housing 17.

One of the prongs 32a may be provided with contact pads 34 for contacting an associated connector on the circuit board 24 within the housing 17, so that the metal trace of the antenna 30 applied around the collar 15 and onto the prong 32a may be connected to the circuit board 24. The path for the metal trace 30 from the collar 15 to the prong 32a may include a narrow recess 19 and a rib 21. The edges of the recess 19 may be rounded and the face of the rib 21 may be curved, so that a robust metal trace 30 may be formed by laser ablation with relative ease. The connectors on the circuit board 24 may be in the form, for example, of resilient spring contacts 26 that are depressed upon insertion of the lens fastener 16 into the top enclosure 18 of the housing to ensure good electrical contact between the antenna 30 and transceiver circuitry on the circuit board 24. The lens fastener 16 may also include bearing surfaces 23a, 23b adjacent or proximate to the male prongs 32b, 32c. The bearing surfaces 23a, 23b will bear against the top of the housing 17 and are dimensioned to control the compression distance of the contact pads 34.

One or more male prongs 32a, 32d may also serve as guides that are configured to facilitate mating with one or more corresponding slots 33a, 33d when the lens fastener 16 is positioned correctly relative to the module housing. This may be accomplished, for example, by using guides 32a, 32d and corresponding slots 33a, 33d that are of different dimensions and/or placing mating locations asymmetrically about the circumference of the cylindrical section of the top portion of the housing. This prevents incorrect positioning/alignment and enables assembly only when the prongs 32a, 32d serving as guides and their corresponding mating slots 33a, 33d are aligned as a result of correctly positioning the lens fastener relative to the housing. This also ensures alignment of the contact pads 34 of the fastener prong(s) 32a with the corresponding spring contacts on the PCB 24.

The antenna 30 may be provided, such that the antenna 30 is embedded in or traced onto the outer surface of the male prong 32a, as well as a portion of the outer surface about the perimeter of the lens retainer 16. As would be appreciated by one of ordinary skill in the art, the location of the antenna 30 is not limited to the perimeter of the lens fastener 16, but may be embedded or traced along any region of the outer or inner surfaces of the component, as long as the antenna 30 is provided with an appropriate length, geometry, and design frequency to transmit and receive various radio-frequency signals, such as Bluetooth, Bluetooth low-energy (BLE) or sub-GHz signal. The wire antenna may be of variable length. For example, the antenna may be made from any length of wire or LDS plated metal, e.g. 50 to 100 mm, depending on the frequency of operation of the wireless device. In the example implementations, the sub GHz signal may be in the range of 750 MHz to 930 MHz, more preferably in the range of 902 MHz to 928 MHz (one of the industrial, scientific and medical (ISM) bands in the United States). The location of the antenna on or in proximity to the lens assembly, e.g. on the lens fastener and/or the housing, reduces the potential for interference from nearby grounded metal structures. A single trace for the antenna may be designed for multiplex use with multiple frequencies, or multiple traces may mate with multiple PCB contacts for multiple simultaneous frequencies. Because the control device may be provided with one or more antennas, for example on the lens fastener or the housing, the term "or" as used herein in reference to the location of the antenna would have a conjunctive and disjunctive meaning.

Figure 5B:
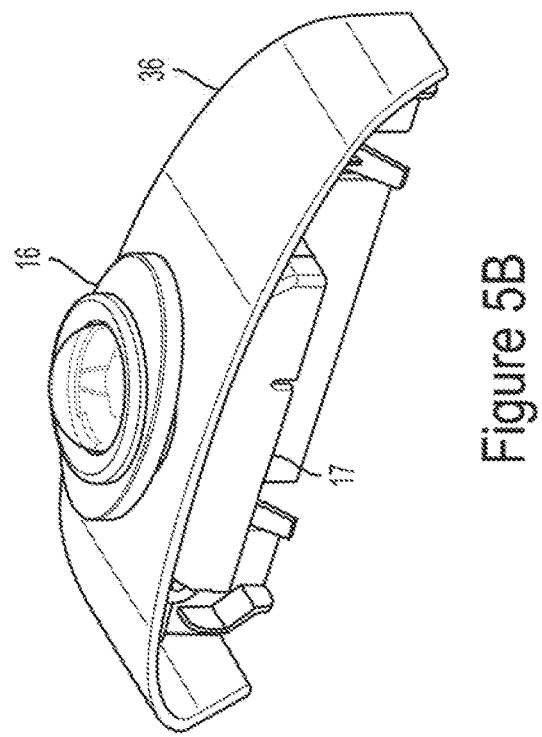
FIG. 5B is a top perspective view of the assembled combination of FIG. 5A.
Figure 5A:
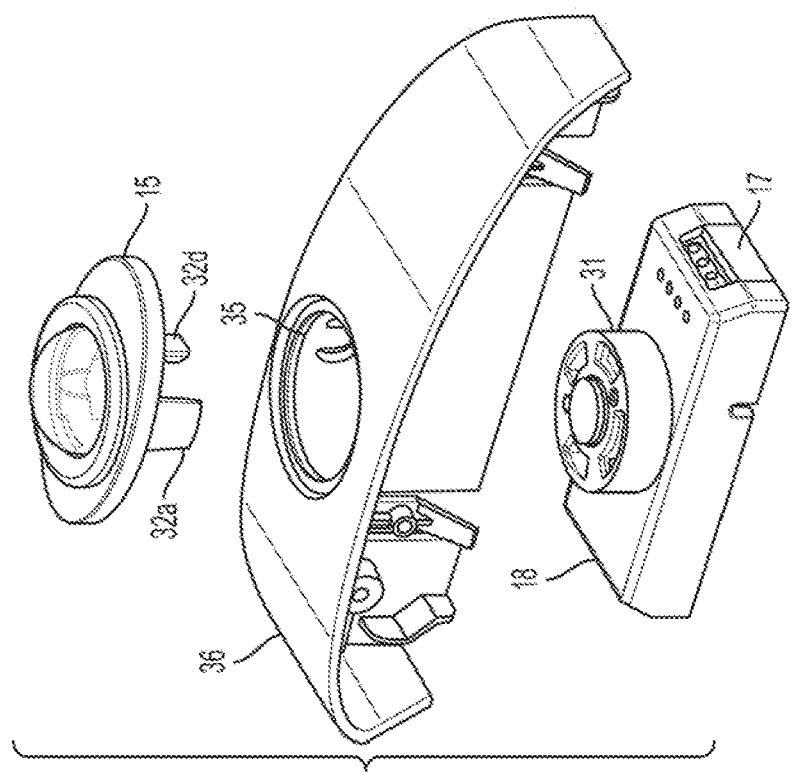
FIG. 5A is an exploded view of a control module in combination with a luminaire endcap.
Figure 7:
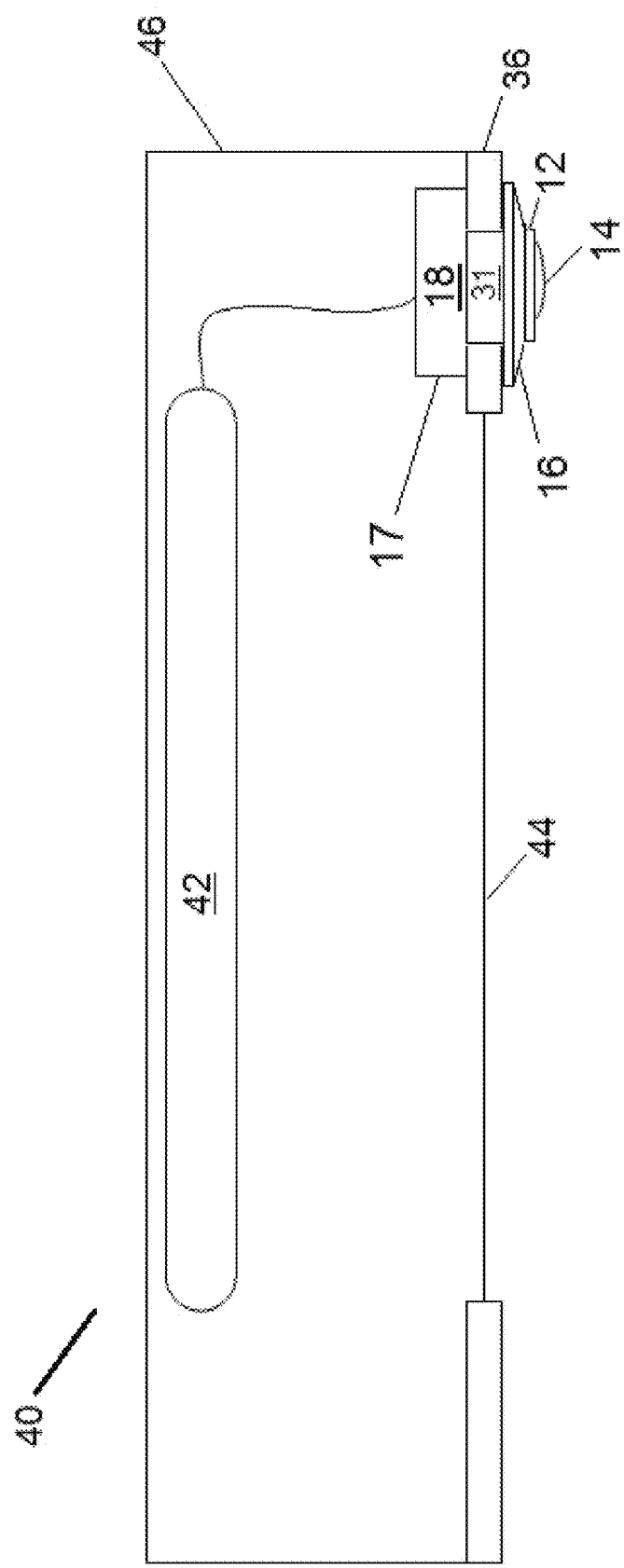
FIG. 7 is a partial cross-sectional view of an example of a luminaire including the sensor and control module mounted in an endcap of the luminaire.

FIG. 7 is a simplified, partial cross-sectional view showing an example of a luminaire 40 including the sensor and control module mounted in an endcap 36 of the luminaire 40. FIGS. 5A and 5B are exploded and assembled views of an example of the control module and endcap 36 of the luminaire. In FIGS. 5A, 5B, and 7, the sensor and control module, the lens and fastener, and the associated antenna may be implemented as described above relative to FIGS. 1-4.

In the views of FIGS. 5A and 5B, the endcap 36 by way of example has a curved aesthetic outer contour for assembly with corresponding diffuser and housing components of the luminaire, although other shapes or designs may be used, e.g. for mechanical performance reasons, ease of assembly and/or to achieve a desirable design aesthetic for the luminaire 40. FIG. 7 shows the luminaire 40 in an orientation for downward emission of light and a corresponding downward field of view for the sensor module, as for example, if the luminaire 40 were mounted in or on a ceiling or hung below the ceiling. For convenience, FIGS. 5A and 5B show the endcap 36 and the sensor module in an upward facing orientation.

As illustrated in FIGS. 5A, 5B, and 7, the sensor module may be fastened to the endcap 36 of a luminaire 40 adjacent to a diffuser 44. The diffuser may have various shapes and/or be made of a variety of materials, for aesthetic reasons or to achieve a desired light output distribution. Other optical elements may be used instead of or in addition to the diffuser. In some luminaires, the diffuser may be omitted although a transparent cover may be provided to protect the light source 42 from contact with foreign objects or contaminants.

Attachment of the sensor module to the endcap 36 of the luminaire 40 may be accomplished by providing the lens fastener 16 with a collar portion 15 that has a diameter larger than the diameter of the a module mounting aperture 35 in the endcap 36. The prongs of the lens fastener 16 and a cylindrical section 31 of the top portion 18 of the housing 17 may be inserted into the module mounting aperture 35 in the endcap 36 and fastened to each other, such that the endcap is "sandwiched" between the module housing 17 and the lens fastener 16. In this way, a majority of the module and the components thereof may be positioned above the outer surface of the endcap 36 within the luminaire 40 where the light source 42 resides while the lens fastener 16 having the antenna remains below the outer surface of the endcap 36, in the orientation example shown in FIG. 7. In other words, as shown in FIG. 5A, the collar portion 15 is outside the enclosure formed by the endcap 36, therefore the antenna extends at a location at least partially outside the wireless lighting control module and the portion of the interior space of the luminaire enclosed by the endcap 36. This positioning offers a robust aesthetically pleasing antenna that may be exposed below the ceiling plane.

The lens fastener 16 also functions to secure the sensor module 10 to the endcap 36 of the luminaire 40 without the need for tools or additional fasteners. For example the resilient male prongs extending from the bottom of the lens fastener may include detents that may be inserted and released from corresponding mating slots in the cylindrical section of the module housing. The cylindrical section and prongs may mate within a mounting aperture in the endcap 36 of the luminaire housing. Coupling and decoupling of the lens fastener to and from the module housing will therefore secure or release the sensor module 10 from the endcap 36 of the luminaire 40. At least the assembly may be accomplished by hand without a tool due to a snap fit design of the male prongs and mating slots. This allows for the reduction of parts for the assembly by combining the antenna and the lens fastener, for example, into a single component. It also enables the sensor module to be located in a position away from and/or outside of grounded metallic elements of the luminaire 40 that may affect the performance of the antenna. The compact design of the sensor module also allows for compliance with local safety regulations that may require the entire luminaire, including the antenna, to be located within an electrical box, e.g. formed by the endcap, the housing components and the diffuser of the luminaire.

Figure 6:
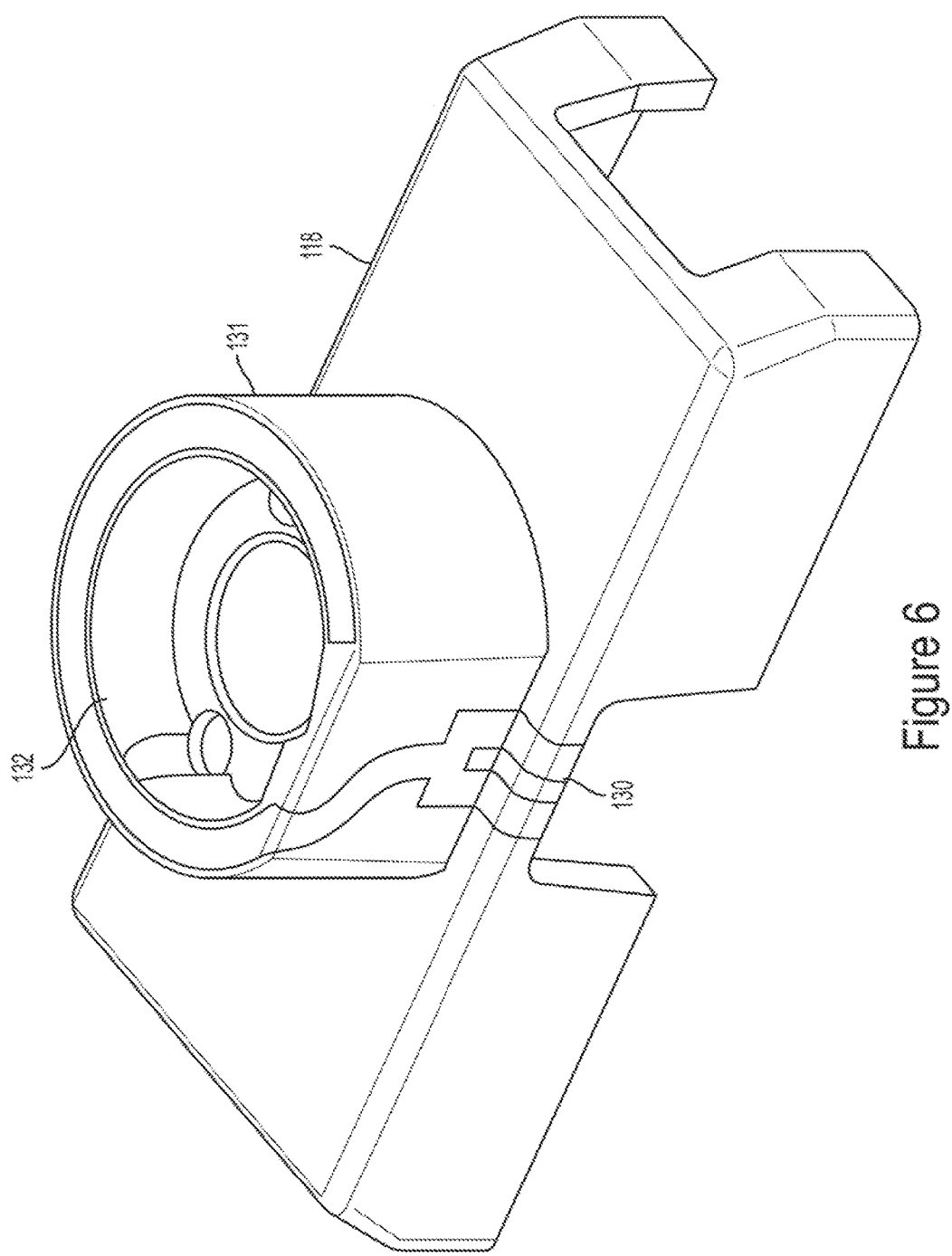
FIG. 6 is a top perspective view of an example of a housing for a control module.

In an alternative example illustrated in FIG. 6, an antenna 130 may be embedded in or traced onto the outer surface of an end region of the cylindrical portion 131 of a top enclosure 118 of the module housing. In such an arrangement, the antenna 130 may be within the space of the luminaire enclosed by the endcap if the cylindrical portion 131 resides within the endcap. Alternatively, the antenna 130 may be integrated into a section of the cylindrical portion 131 of the top enclosure 118 of the housing that extends through the mounting aperture 35 and outside the space of the luminaire enclosed by the endcap. For example, The top enclosure 118 may be similar to the previously described top enclosure, except that the cylindrical portion 131 may be longer. The height of the cylindrical portion 131 may be equal to or greater than the depth of the mounting aperture of the endcap in which the sensor module is inserted. This will ensure that the surface of the end region of the cylindrical portion 131 on which the antenna 130 has been traced or embedded is flush with or outside the exterior of the endcap. A lens may be inserted into the center bore 132 within the cylindrical portion 131 and held in place using a fastener or an adhesive, for example. A separate mechanism may be applied to the top or outer circumferential wall of the cylindrical portion 131, such as a snap-fit Fresnel lens assembly or a C-clip, to captivate the sensor module within the mounting aperture of the endcap.

Whether using the example of FIGS. 1-4 or the example of FIG. 6, the cylindrical portion of the top enclosure may be provided as other shapes, e.g. square, triangular, hexagonal, etc. In some implementations, the outer shape of the portion may match the shape of the mounting aperture and the shape may be asymmetrical, for example, to facilitate proper orientation of the sensor module with respect to the endcap during assembly.

Figure 8:
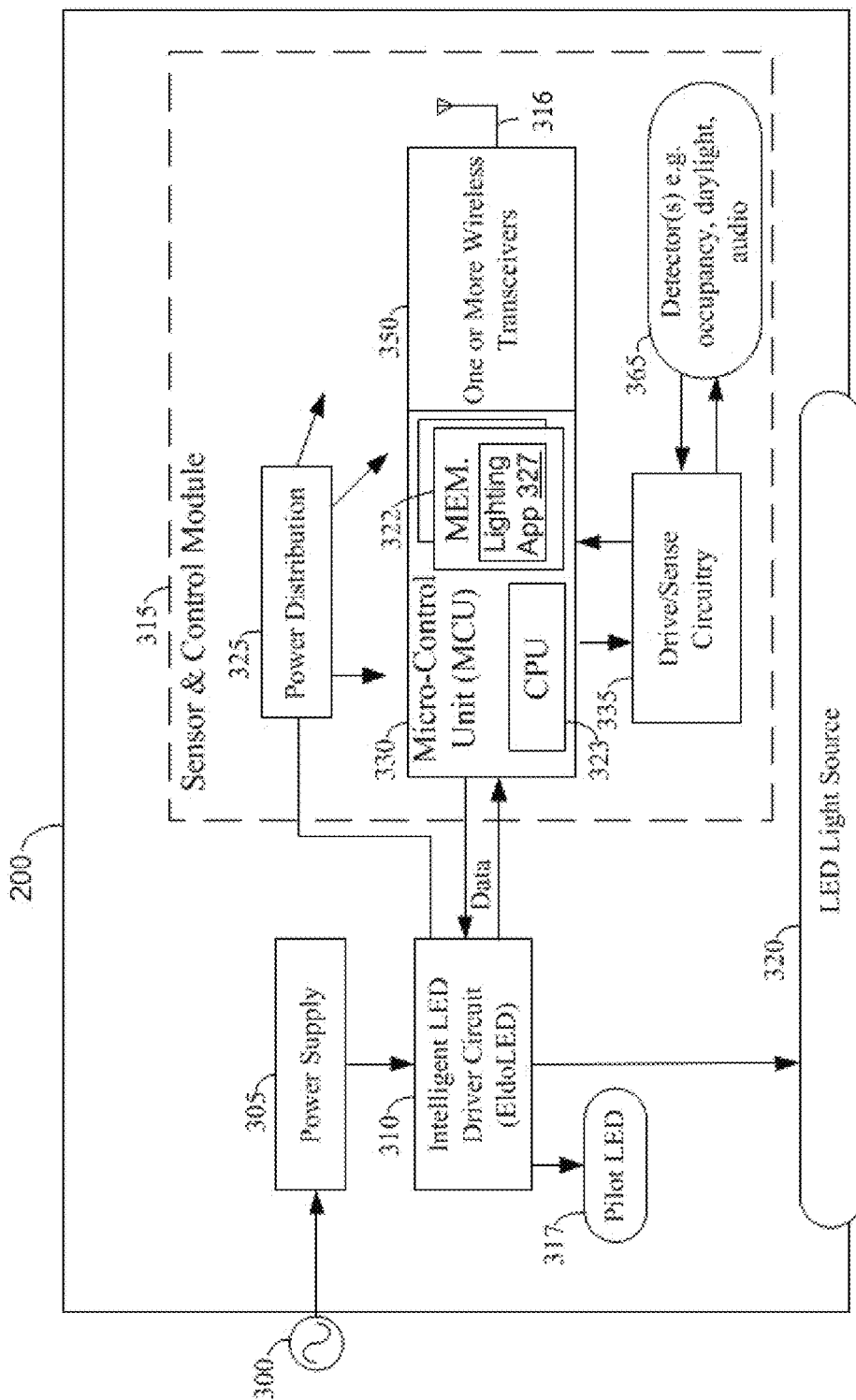
FIG. 8 is a functional block diagram of the elements of an example of a luminaire that includes a sensor and control module with an antenna assembly.

One or more luminaires, such as the luminaire 200 illustrated in the functional block diagram of FIG. 8, may be combined within a wireless intelligent lighting system. Luminaire 200 is an integrated light fixture that generally includes a power supply 305 driven by a power source 300. Power supply 305 receives power from the power source 300, such as an AC mains, battery, solar panel, or any other AC or DC source. Power supply 305 may include a magnetic transformer, electronic transformer, switching converter, rectifier, or any other similar type of circuit to convert an input power signal into a power signal suitable for luminaire 200.

Luminaire 200 further includes an intelligent LED driver circuit 310, sensor/control module 315, and a light emitting diode (LED) light source 320. Intelligent LED driver circuit 310 is coupled to LED light source 320 and drives that LED light source 320 by regulating the power to LED light source 320 by providing a constant quantity or power to LED light source 320 as its electrical properties change with temperature, for example. The intelligent LED driver circuit 310 includes a driver circuit that provides power to LED light source 320 and a pilot LED 317. The pilot LED 317 may be included as part of the sensor/control module 315. Intelligent LED driver circuit 310 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 310 is manufactured by EldoLED.

LED driver circuit 310 can further include an AC or DC current source or voltage source, a regulator, an amplifier (such as a linear amplifier or switching amplifier), a buck, boost, or buck/boost converter, or any other similar type of circuit or component. LED driver circuit 310 outputs a variable voltage or current to the LED light source 320 that may include a DC offset, such that its average value is nonzero, and/or a AC voltage. The pilot LED 317 indicates the state of the luminaire 10, for example, during the commissioning and maintenance process.

For purposes of communication and control, luminaire 200 is treated as single addressable device that can be configured to operate as a member of one or more lighting control groups or zones. The luminaire 200 is line powered and remains operational as long as power is available.

Sensor/control module 315 includes power distribution circuitry 325, a micro-control unit (MCU) 330, drive/sense circuitry 335, and detector(s) 365. As shown, MCU 330 is coupled to LED driver circuit 310 and controls the light source operation of the LED light source 320. MCU 330 includes a memory 322 (volatile and non-volatile) and a central processing unit (CPU) 323. The memory 322 may include a lighting application 327 (which can be firmware) for both lighting control operations and commissioning, maintenance, and diagnostic operations. The power distribution circuitry 325 distributes power and ground voltages to the MCU 330, drive/sense circuitry 335, wireless transceivers 350, and detector(s) 365 to provide reliable operation of the various circuitry on the sensor/control module 315 chip.

In one lighting system, the sensor/control module 315 may include various components associated with the drive/sense circuitry 335 and detectors 365. For example, the printed circuit board for the sensor/control module 315 may include an LED and an indicator LED light pipe for indicating a status of the system and a photosensor light pipe to allow for the automatic adjustment of light emitted by the luminaire based on ambient conditions. Alternatively, the sensor/control module 315 may include a pyroelectric presence sensor, Fresnel lens, and light pipe to direct ambient light from the service area toward pyroelectric sensors on the circuit board. These sensors may be coupled to circuitry that analyzes differences between light incident on the sensors to identify individuals moving in the service area in order to determine when the service area is occupied.

As shown, the MCU 330 includes programming in the memory 322 which configures the CPU (processor) 323 to control operations of the respective luminaire 200, including the communications over the two different wireless communication bands via the one or more wireless transceivers 350. The programming in the memory 322 includes a real-time operating system (RTOS) and further includes a lighting application 327 which is firmware/software that engages in communications with the commissioning/maintenance application of user interface (not shown), such as a mobile device, over a commissioning network. The lighting application 327 programming in the memory 322 carries out lighting control operations over the lighting control network. The RTOS supports multiple concurrent processing threads for different simultaneous control or communication operations of the luminaire 200. In FIG. 8, in addition to the memory 322 and the CPU 323 of the MCU 330 itself, the one or more transceivers 350 may each include a separate memory (not shown) and a processor (not shown).

The micro-control unit 330 of the sensor/control module 315 may, for example, control light emitted by the lighting elements of the luminaire to implement a visible light communication (VLC) system. One example of a VLC system is a location system in which each luminaire broadcasts a respective identifier (ID) value that may be received by a user-operated mobile device (not shown) in the service area. The mobile device may then determine its position by associating the ID value with a location using either previously downloaded data or data accessible to the mobile device via a server computer (not shown).

The drive/sense circuitry 335 may provide power to the lighting elements and modulate the light provided by the lighting elements. For example, if the lighting elements are light emitting diodes (LEDs), the driver 335 converts available AC (or possibly DC) power to current to drive the LEDs to achieve a desired light level. Of course other types of light sources and corresponding driver circuits may be used.

The CPU 323 may be configured to control the operation of the lighting element via the driver/sense circuitry 335. The CPU 323 may also be coupled to communicate via the one or more transceivers to a communication interface (not shown). The communication interface provides communications functions for sending and receiving data via a wireless network operating in the service area.

The CPU 323 may be implemented via hardwired logic circuitry, or it may include a programmable processor such as a programmable central processing unit (CPU) of a microcontroller, microprocessor or the like. The memory 322 may be used for storing programming for execution by the CPU 323 and data, including the ID value.

The sensor/control module 315 may receive lighting commands via the network and provide device status to the network using the communications interface and the antenna 16. The signals and/or commands supplied may cause the sensor/control module 315 to modulate power supplied by the power supply 305 to the lighting elements according to the commands and/or processed data and thereby modulate the output of the light source 320 to turn the lighting elements on or off, to change the illumination characteristics of the lighting elements, or to broadcast data on the modulated light output of the lighting elements into the service area illuminated by the luminaire 200.

Luminaire 200 may also include a dual-band wireless radio communication interface system configured for two way wireless communication. In one example, luminaire 200 has one or more radio transceivers 350 for RF communications having an antenna 16 as described above. The one or more transceivers 350 may issue control operations on the lighting control network for any-to-many communication over a wireless communication band and/or control and systems operations information during luminaire operation and during control network operation. One or more of the radio transceivers 350 may also carry out commissioning, maintenance, and diagnostics of the lighting control network by point-to-point communication, over a different wireless communication band using the same antenna 16, of information other than the control and systems operations information, concurrently with at least some communications over the first wireless communication band.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element. The terms "and" and "or" may have both conjunctive and disjunctive meanings.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A sensor and control module comprising:
a housing;
a lens;
a lens fastener configured to attach the lens to an outer surface of the housing;
a light responsive detector located in the housing so as to receive light through the lens;
circuitry configured to generate a control signal dependent on the light sensed by the light responsive detector;
an antenna formed as an integral component of the lens fastener, the antenna at least partially encircling the lens; and
a wireless radio-frequency transmitter coupled to the antenna and configured to wirelessly transmit the control signal via the antenna.

2. The sensor and control module of claim 1, wherein the antenna is plated on a surface of the lens fastener.

3. The sensor and control module of claim 2, wherein the antenna comprises one or more laser-direct-structuring (LDS) metal traces on the surface of the lens fastener.

4. The sensor and control module of claim 1, wherein the antenna is embedded in the lens fastener.

5. The sensor and control module of claim 1, wherein:
the antenna is formed as an integral component of the lens fastener,
the sensor and control module further comprises a circuit board assembly within the housing, and
the circuitry is provided on the circuit board assembly.

6. The sensor and control module of claim 5, wherein the circuit board assembly includes a spring contact configured to contact a component of the antenna on the lens fastener so as to electrically connect the antenna to the circuitry.

7. A luminaire comprising:
a housing having an endcap with a module mounting aperture;
a light source within the housing; and
a wireless lighting control module coupled to control operation of the light source, the wireless lighting control module including:

a lens;

a module housing;

a lens fastener configured to extend through the module mounting aperture to attach the lens to the module housing with the endcap positioned between the lens fastener and the module housing to also attach the module housing to the endcap;

a wireless transceiver located within the module housing; and an antenna formed as an integral component of the lens fastener at a location at least partially outside the wireless lighting control module and so as to extend outside a portion of interior space of the luminaire at least partially enclosed by the endcap, the antenna being coupled to the wireless transceiver, and the antenna at least partially encircling the lens.

8. The luminaire of claim 7, wherein:

the control module further comprises a circuit board within the housing; and circuitry provided on the circuit board includes the wireless transceiver.

9. The luminaire of claim 8, wherein the lens fastener is removably attached to the module housing.

10. The luminaire of claim 9, wherein the circuit board includes a spring contact configured to contact a component of the antenna on the lens fastener so as to electrically connect the antenna to the wireless transceiver.

11. The luminaire of claim 10, wherein the antenna is plated on a surface of the lens fastener or the housing.

12. The luminaire of claim 11, wherein the antenna comprises one or more laser-direct-structuring (LDS) metal traces on the surface of the lens fastener.

13. The luminaire of claim 10, wherein the antenna is embedded in the lens fastener.

14. The luminaire of claim 9, wherein the lens fastener further comprises one or more male prongs that mate with one or more corresponding slots in the module housing.

15. The luminaire of claim 14, wherein the one or more male prongs include a detent to engage the slots in the module housing and retain the lens fastener to the module housing.

16. The luminaire of claim 14, wherein the one or more male prongs is configured to facilitate mating with the one or more corresponding slots when the lens fastener is positioned correctly relative to the module housing.

17. The luminaire of claim 14, wherein the one or more male prongs is provided with contact pads for contacting an associated connector on the circuit board to connect the antenna to the circuit board.

18. The luminaire of claim 9, wherein the light source comprises a light emitting diode (LED) source.

19. The luminaire of claim 9, wherein the antenna has a length in a range of 50 to 100 mm, the length corresponding to a frequency of operation of the wireless transceiver.

20. The luminaire of claim 7, further comprising:

a circuit board within the housing, a light responsive detector located in the module housing so as to receive light through the lens;

wherein circuitry provided on the circuit board includes the wireless transceiver, and the circuitry is configured to generate a control signal dependent on the light sensed by the light responsive detector; and the wireless transceiver is configured to wirelessly transmit the control signal via the antenna.

21. A luminaire comprising:

a housing having an endcap with a module mounting aperture;

a light source within the housing; and a wireless lighting control module coupled to control operation of the light source, the wireless lighting control module including:

a lens;

a module housing having a portion extending through the module mounting aperture;

a lens fastener configured to attach the lens to the portion of the module housing;

a module fastener attached to the portion of the module housing with the endcap positioned between the module fastener and the module housing to also attach the module housing to the endcap;

a wireless transceiver located within the module housing; and an antenna formed as an integral component of the module housing, the antenna being coupled to the wireless transceiver, and the antenna at least partially encircling the lens.

22. The luminaire of claim 21, wherein the control module further comprises:

a circuit board within the housing; and circuitry provided on the circuit board includes the wireless transceiver.

23. The luminaire of claim 22, wherein the circuit board includes a spring contact configured to contact a component of the antenna on the module housing so as to electrically connect the antenna to the wireless transceiver.

24. The luminaire of claim 21, wherein the antenna is plated on a surface of the module housing.

25. The luminaire of claim 24, wherein the antenna comprises one or more laser-direct-structuring (LDS) metal traces on the surface of the module housing.

26. The luminaire of claim 21, wherein the antenna is embedded in the module housing.

27. The luminaire of claim 21, further comprising:

a circuit board within the housing, a light responsive detector located in the module housing so as to receive light through the lens;

wherein circuitry provided on the circuit board includes the wireless transceiver, and the circuitry is configured to generate a control signal dependent on the light sensed by the light responsive detector; and the wireless transmitter is configured to wirelessly transmit the control signal via the antenna.

* * * * *